US008749583B2

(12) United States Patent
Suzuki et al.

(10) Patent No.: US 8,749,583 B2
(45) Date of Patent: Jun. 10, 2014

(54) INFORMATION PROCESSING APPARATUS, INFORMATION PROCESSING SYSTEM, AND INFORMATION PROCESSING METHOD

(75) Inventors: Kazuhiro Suzuki, Tokyo (JP); Akira Miyashita, Kanagawa (JP); Hiroyuki Ishige, Tokyo (JP)

(73) Assignee: Sony Corporation, Tokyo (JP)

( * ) Notice: Subject to any disclaimer, the term of this patent is extended or adjusted under 35 U.S.C. 154(b) by 727 days.

(21) Appl. No.: 12/979,958

(22) Filed: Dec. 28, 2010

(65) Prior Publication Data

US 2011/0169861 A1 Jul. 14, 2011

(30) Foreign Application Priority Data

Jan. 8, 2010 (JP) ................................ 2010-003140

(51) Int. Cl.
*G09G 5/00* (2006.01)

(52) U.S. Cl.
USPC ........... 345/632; 345/619; 345/629; 345/633; 345/635

(58) Field of Classification Search
USPC ..................................... 345/7, 8, 9, 629–633
See application file for complete search history.

(56) References Cited

U.S. PATENT DOCUMENTS

2006/0050087 A1* 3/2006 Tanimura et al. ............. 345/629
2006/0071945 A1* 4/2006 Anabuki ....................... 345/633
2011/0090343 A1* 4/2011 Alt et al. ....................... 348/164

FOREIGN PATENT DOCUMENTS

JP 2007-75213 3/2007

OTHER PUBLICATIONS

U.S. Appl. No. 13/131,831, filed May 27, 2011, Miyashita, et al.
U.S. Appl. No. 13/337,937, filed Dec. 27, 2011, Miyashita, et al.
U.S. Appl. No. 13/935,305, filed Jul. 3, 2013, Miyashita, et al.

* cited by examiner

*Primary Examiner* — Ke Xiao
*Assistant Examiner* — Kim-Thanh T Tran
(74) *Attorney, Agent, or Firm* — Oblon, Spivak, McClelland, Maier & Neustadt, L.L.P.

(57) ABSTRACT

A first image pickup means picks up an image of a real space, to thereby obtain a first background image.

A first positional relationship estimating unit estimates, in a case where the first background image includes a first marker image being an image of a marker previously registered and located in the real space, a first positional relationship being a spatial positional relationship of the first image pickup means to the marker based on the first marker image, and estimates, in a case where the first background image fails to include the first marker image, the first positional relationship based on a displacement of a feature point extracted from the first background image.

An image generating unit generates a first additional image based on the first positional relationship, and synthesizes the first additional image and the first background image, to thereby generate a synthetic image.

10 Claims, 12 Drawing Sheets

FIG.3A
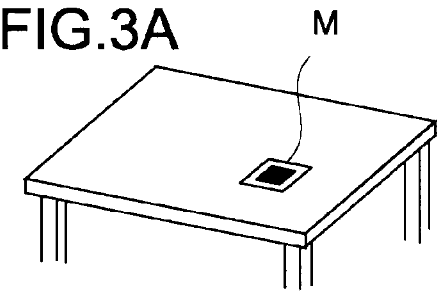
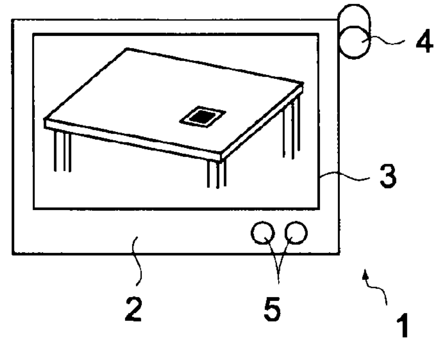
FIG.3B
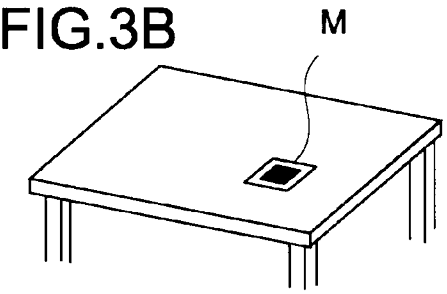
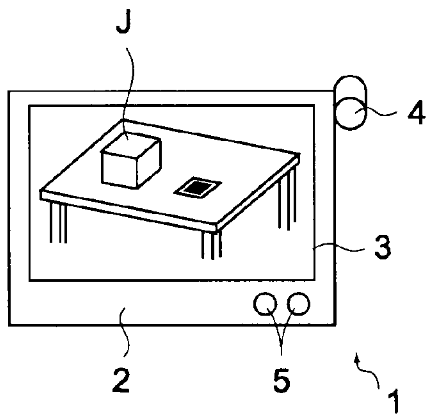
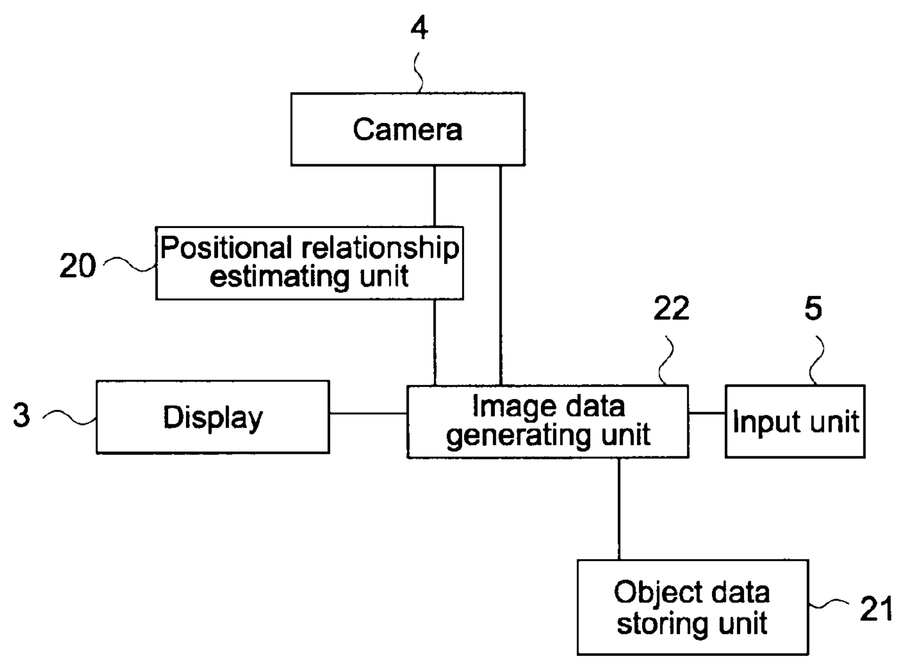
FIG.4

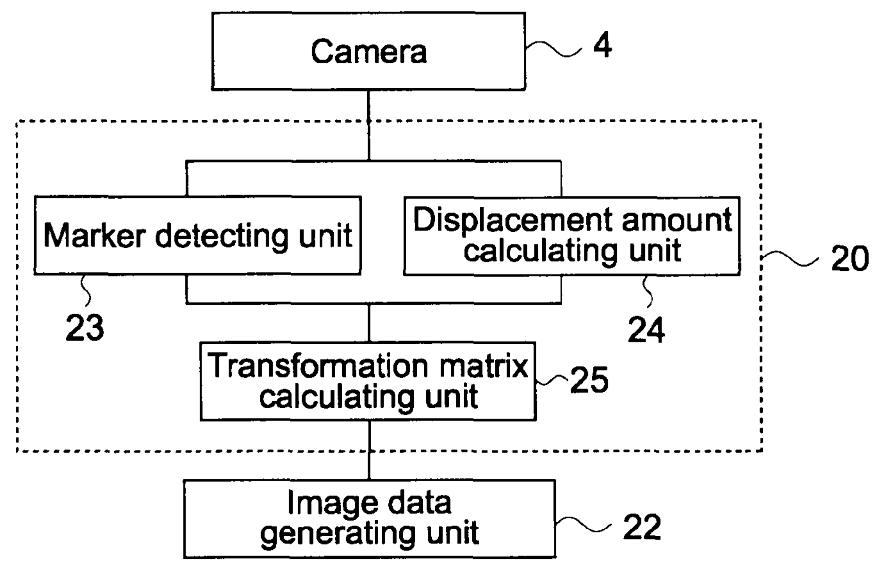
FIG.5
FIG.6A
FIG.6B
FIG.6C
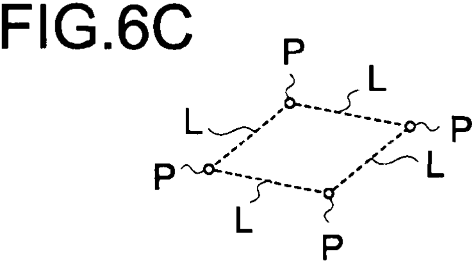

INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to an information processing apparatus, an information processing system, and an information processing method to synthesize an image of a real environment with an image corresponding to the real environment to display.

2. Description of the Related Art

There is known a technique called augmented reality (AR) in which an image corresponding to a real environment is added to an image of the real environment.

In the AR, an image of a real environment is obtained by a camera or the like, and an additive image (hereinafter, additional image) corresponding to the real environment is synthesized with the obtained image of the real environment, to thereby be displayed on a display screen.

A user watches the image in which the image of the real environment and the additional image are synthesized, to thereby recognize as if an object or an image displayed as the additional image exists in the real environment.

In the AR, it is important to accurately establish a correspondence between an obtained image of a real environment and an additional image, that is, to match a position, size, angle, and the like of the additional image with the real environment. In a case where the correspondence is not established accurately, the position, size, angle, and the like of the displayed additional image with respect to the real environment becomes unnatural.

For example, Hirokazu Kato, Mark Billinghurst, Koichi Asano, and Keihachiro Tachibana, "An Augmented Reality System and its Calibration based on Marker Tracking", Journal of The Virtual Reality Society of Japan, Vol. 4, No. 4, 1999, http://intron.kz.tsukuba.ac.jp/tvrsj/4.4/kato/p-99_VRSJ4__4.pdf (hereinafter, referred to as Non-patent Document 1) describes an AR system using a marker. In this system, image information on a marker (colored square having a predetermined size) is previously registered. In a case where an image of a real environment includes the image of the marker, the marker is detected in the image of the real environment, and a spatial positional relationship of a camera to the marker is calculated based on information on the size, angle, and the like. Based on the positional relationship, a virtual object is displayed on an HDM whose relative position to the camera is fixed, and a user is capable of watching the virtual object together with the real environment.

Further, the AR is capable of, not only displaying the real environment in relation with the additional image, but also changing the additional image according to an input by a user. For example, when a user aims a pointer at a real environment while watching the real environment to which the additional image is added, an operation of changing the additional image corresponding to the instructed position of the real environment is enabled. Japanese Patent Application Laid-open No. 2007-75213, paragraph 0086, FIG. 7 (hereinafter, referred to as Patent Document 1) describes an information processing program enabling such an operation.

Patent Document 1 describes an apparatus including two markers (infrared ray light sources) provided on the periphery of a monitor so as to be spaced apart, and a controller having an image pickup device capable of picking up an image of those markers. When a user operates the controller while aiming the controller at the monitor, a spatial positional relationship of the controller to the monitor is calculated based on the distance, angle, and the like of the two markers picked up by the image pickup device, and the operation by the user is input to the apparatus.

SUMMARY OF THE INVENTION

However, according to the techniques of both Patent Document 1 and Non-patent Document 1, a sign (marker) should be included in the image pickup area of the image pickup means. Therefore, an image synthesized with an additional image is displayed only in an area in which the marker is picked up by the image pickup means.

In view of the above-mentioned circumstances, it is desirable to provide an information processing apparatus, an information processing system, and an information processing method capable of displaying an additional image corresponding to a real environment even in a case where a marker is not included in an image pickup area.

To attain the above-mentioned object, an information processing apparatus according to an aspect of the present invention includes a first image pickup means, a first positional relationship estimating unit, an image generating unit, and a display means.

The first image pickup means picks up an image of a real space, to thereby obtain a first background image.

The first positional relationship estimating unit estimates, in a case where the first background image includes a first marker image being an image of a marker previously registered and located in the real space, a first positional relationship being a spatial positional relationship of the first image pickup means to the marker based on the first marker image, and estimates, in a case where the first background image fails to include the first marker image, the first positional relationship based on a displacement of a feature point extracted from the first background image.

The image generating unit generates a first additional image based on the first positional relationship, and synthesizes the first additional image and the first background image, to thereby generate a synthetic image.

The display means displays the synthetic image.

In the case where the first background image includes the first marker image, the first positional relationship estimating unit is capable of estimating the first positional relationship by comparing the first marker image and the information on the marker previously registered in the first positional relationship estimating unit. Meanwhile, in the case where the first background image does not include the first marker image, the first positional relationship estimating unit is capable of estimating the first positional relationship based on the displacement of the feature point extracted from the background image including the marker image previously picked up by the first image pickup means and the feature point extracted from the first background image. The image generating unit determines the position, direction, size, and the like of the first additional image matching the first background image by using the first positional relationship, to synthesize the first additional image with the first background image. Because the first additional image is generated according to the first positional relationship, that is, according to the position and direction of the first image pickup means to the marker in the real space, a user recognizes as if a virtual object exists in the real space. Even in a case where the first background image does not include the first marker image, that is, the image pickup area of the first image pickup means does not include the marker, the information processing apparatus is capable of displaying the synthetic image in which the first additional image matching the first background image is synthesized.

The information processing apparatus may further include a second image pickup means, a second positional relationship estimating unit, and a receiving unit.

The second image pickup means may pick up an image of a real space, to thereby obtain a second background image.

The second positional relationship estimating unit may estimate, in a case where the second background image includes a second marker image being an image of the marker, a second positional relationship being a spatial positional relationship of the second image pickup means to the marker based on the second marker image.

The receiving unit may receive, in a case where the second background image fails to include the second marker image, the second positional relationship transmitted from an apparatus to estimate the second positional relationship based on a displacement of a feature point extracted from the second background image.

The image generating unit may generate the first additional image based on the first positional relationship and the received second positional relationship, and synthesize the first additional image and the first background image, to thereby generate the synthetic image.

According to this structure, the image generating unit obtains, in addition to the first positional relationship, the second positional relationship being a positional relationship of the second image pickup means, and the image generating unit is capable of making a change to the first additional image based on the first positional relationship and the second positional relationship. Therefore, it is possible to change the first additional image as if a change corresponding to the second positional relationship is made to the virtual object.

To attain the above-mentioned object, an information processing system according to an aspect of the present invention includes a first information processing apparatus and a second information processing apparatus.

The first information processing apparatus includes a first image pickup means and a first positional relationship estimating unit.

The first image pickup means picks up an image of a real space, to thereby obtain a first background image.

The first positional relationship estimating unit estimates, in a case where the first background image includes a first marker image being an image of a marker previously registered and located in the real space, a first positional relationship being a spatial positional relationship of the first image pickup means to the marker based on the first marker image, and estimates, in a case where the first background image fails to include the first marker image, the first positional relationship based on a displacement of a feature point extracted from the first background image.

The second information processing apparatus includes a second image pickup means, a second positional relationship estimating unit, and a transmitting unit.

The second image pickup means picks up an image of a real space, to thereby obtain a second background image.

The second positional relationship estimating unit estimates, in a case where the second background image includes a second marker image being an image of the marker, a second positional relationship being a spatial positional relationship of the second image pickup means to the marker based on the second marker image, and estimates, in a case where the second background image fails to include the second marker image, the second positional relationship based on a displacement of a feature point extracted from the second background image.

The transmitting unit transmits the second positional relationship to the first information processing apparatus.

The first information processing apparatus further includes a receiving unit, an image generating unit, and a display means.

The receiving unit receives the second positional relationship transmitted from the second information processing apparatus.

The image generating unit generates a first additional image based on the first positional relationship and the received second positional relationship, and synthesizes the first additional image and the first background image, to thereby generate a synthetic image.

The display means displays the synthetic image.

Each of the first image pickup means and the second image pickup means picks up an image of the real space. For example, the first image pickup means is a camera provided on the apparatus main body, and the second image pickup means is a camera provided on the controller. Because of the difference of the spatial positions of the first image pickup means and the second image pickup means, the first background image and the second background image are different from each other. In the first image pickup means, as described above, the first positional relationship estimating unit estimates the first positional relationship. In the second image pickup means, the second positional relationship estimating unit estimates the second positional relationship by comparing the second marker image and information on the marker previously registered in the second positional relationship estimating unit, or estimates the second positional relationship based on the displacement of the feature point extracted from the background image including the marker image previously picked up by the second image pickup means and the feature point extracted from the second background image.

Therefore, the image generating unit is capable of making a change to the first additional image based on the first positional relationship and the second positional relationship. Therefore, it is possible to change the first additional image as if the change according to the second positional relationship is made to the virtual object.

The second information processing apparatus may further include an input unit to allow an input operation by a user.

The image generating unit may change the first additional image according to an instruction input through the input unit.

According to this structure, the information processing system is capable of displaying the first additional image changed according to the second positional relationship when the instruction is input by a user.

The image generating unit may calculate a third positional relationship being a spatial positional relationship of the second image pickup means to the first image pickup means based on the first positional relationship and the second positional relationship, further generate a second additional image added to the background image based on the third positional relationship, and synthesize the first additional image, the background image, and the second additional image, to thereby generate the synthetic image.

The information processing system is capable of synthesizing the second additional image with the real image according to the spatial positional relationship of the second image pickup means to the first image pickup means. For example, in a case where the image pickup area of the first image pickup means includes the second image pickup means, the information processing system is capable of displaying an image representing the second image pickup means corresponding to the positional relationship of the second image pickup means to the first image pickup means, that is, the third positional relationship.

To attain the above-mentioned object, a program according to an aspect of the present invention causes a computer to function as a first positional relationship estimating unit and an image generating unit.

The first positional relationship estimating unit estimates, in a case where a first background image picked up by a first image pickup means includes a first marker image being an image of a marker previously registered and located in the real space, a first positional relationship being a spatial positional relationship of the first image pickup means to the marker based on the first marker image, and estimates, in a case where the first background image fails to include the first marker image, the first positional relationship based on a displacement of a feature point extracted from the first background image.

The image generating unit generates a first additional image based on the first positional relationship, and synthesizes the first additional image and the first background image, to thereby generate a synthetic image.

To attain the above-mentioned object, according to an information processing method according to an aspect of the present invention, the first image pickup means picks up an image of a real space, to thereby obtain a first background image.

The first positional relationship estimating unit estimates, in a case where the first background image includes a first marker image being an image of a marker previously registered and located in the real space, a first positional relationship being a spatial positional relationship of the first image pickup means to the marker based on the first marker image, and estimates, in a case where the first background image fails to include the first marker image, the first positional relationship based on a displacement of a feature point extracted from the first background image.

The image generating unit generates a first additional image based on the first positional relationship, and synthesizes the first additional image and the first background image, to thereby generate a synthetic image.

The display means displays the synthetic image.

As described above, according to the present invention, it is possible to provide an information processing apparatus, an information processing system, and an information processing method capable of displaying an additional image corresponding to a real environment even in a case where an image pickup area does not include a marker.

These and other objects, features and advantages of the present invention will become more apparent in light of the following detailed description of best mode embodiments thereof, as illustrated in the accompanying drawings.

BRIEF DESCRIPTION OF DRAWINGS

FIG. 3 are schematic diagrams exemplifying an outline of generation of an augmented reality image by the information processing apparatus;

FIG. 4 is a block diagram showing a functional structure of the information processing apparatus;

FIG. 5 is a block diagram showing a positional relationship estimating unit of the information processing apparatus in detail;

FIG. 6 are schematic diagrams showing a marker;

DESCRIPTION OF PREFERRED EMBODIMENTS

Hereinafter, embodiments of the present invention will be described with reference to the drawings.

First Embodiment

A first embodiment according to the present invention will be described.

Figure 1:
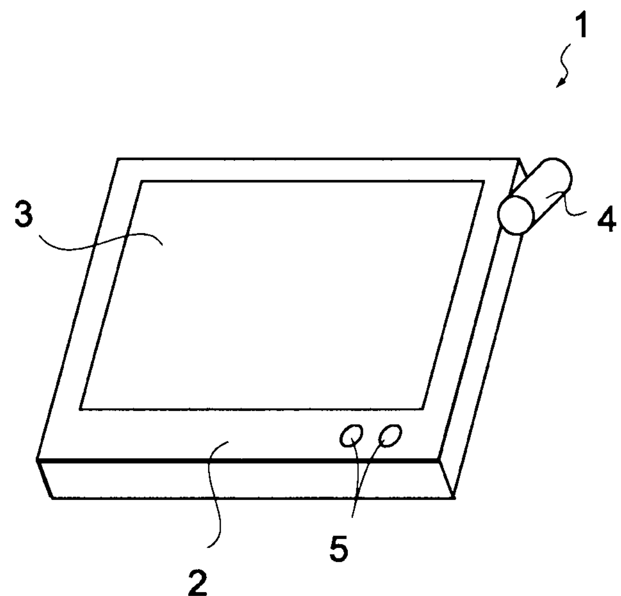
FIG. 1 is a perspective view showing an outer appearance of an information processing apparatus according to a first embodiment.

FIG. 1 is a perspective view showing an outer appearance of an information processing apparatus 1 according to the first embodiment of the present invention.

As an example of the information processing apparatus 1, a portable information terminal will be described.

As shown in FIG. 1, the information processing apparatus 1 includes a main body 2, a display 3, and a camera 4 (first image pickup means). An input unit 5 such as a press button switch is provided on the main body 2. The display 3 may be one using a display element which is capable of being made lighter in weight and thinner such as a liquid crystal display, a plasma display, and an organic EL (Electro-Luminescence) display.

The camera 4 may be one structured by using an image pickup device such as, for example, a CCD (Charge Coupled Device) or a CMOS (Complementary Metal Oxide Semiconductor). The camera 4 is provided on the main body 2 such that an image pickup direction is the same as an eye direction of a user, that is, opposite to a display surface side of the display 3. As described below, in the AR (Augmented Reality) system, the camera 4 functions as a vision of a user.

Figure 2:
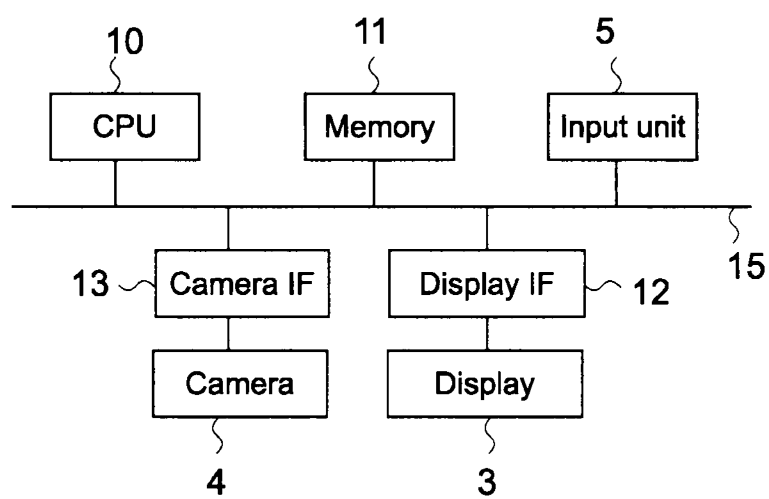
FIG. 2 is a block diagram showing a structure of the information processing apparatus.

FIG. 2 is a block diagram showing a structure of the information processing apparatus 1.

As shown in FIG. 2, the information processing apparatus 1 further includes a CPU (Central Processing Unit) 10, a memory 11, a display interface 12, and a camera interface 13. The display 3 is connected to the display interface 12, and the camera 4 is connected to the camera interface 13. The CPU 10, the memory 11, the display interface 12, the camera interface 13, and the input unit 5 are connected to each other by a bus 15. Note that, the structure of the information processing apparatus 1 is not limited to the one shown here.

FIG. 3 are schematic diagrams exemplifying an outline of generation of an AR image (augmented reality image) by the information processing apparatus 1. Here, as a real object located in a real space, a "desk" is cited as an example. A marker M is put on the desk. As shown in FIG. 3A, the camera 4 of the information processing apparatus 1 picks up an image of the real space (hereinafter, real image), which is displayed on the display 3. The real image includes an image of the marker M. When an AR image generation instruction is given by a user to the information processing apparatus 1, as shown in FIG. 3B, an AR image in which the real image is synthesized with an image of the object (hereinafter, object image) J, that is, an AR image as if a virtual object exists in the real space, is displayed on the display 3. Note that, in the example of FIG. 3, the object is assumed to be a virtual three-dimensional (solid) object, but may be a virtual two-dimensional (flat) object. The generating process of the AR image will be described below in detail.

FIG. 4 is a block diagram showing a functional structure of the information processing apparatus 1.

As shown in FIG. 4, as the functional structure, the information processing apparatus 1 includes, in addition to the above-mentioned display 3, camera 4, and input unit 5, a positional relationship estimating unit 20 (first positional relationship estimating unit), an object data storing unit 21, and an image data generating unit 22 (image generating unit). Note that, the positional relationship estimating unit 20, the object data storing unit 21, and the image data generating unit 22 are implemented by the CPU 10, the memory 11, and the like.

The camera 4 picks up an image of a real space, and supplies image data of the picked-up real space (hereinafter, real image data) to the positional relationship estimating unit 20 and the image data generating unit 22.

The positional relationship estimating unit 20 estimates a spatial positional relationship of the camera 4 to the marker M in the real space based on the real image data supplied from the camera 4. The spatial positional relationship means a coordinate and a direction in the real space. Specifically, the positional relationship estimating unit 20 generates a space coordinate transformation matrix to transform a coordinate system with reference to the marker M in the real space (hereinafter, marker coordinate system) into a coordinate system with reference to the camera 4 in the real space (hereinafter, camera coordinate system). The positional relationship estimating unit 20 supplies the space coordinate transformation matrix to the image data generating unit 22. The positional relationship estimating unit 20 will be described below in detail.

The object data storing unit 21 previously stores data for drawing an object (hereinafter, object data). The object data stored in the object data storing unit 21 may be three-dimensional object data or two-dimensional object data. Further, the object data may be a piece of virtual object data or a plurality of pieces of virtual object data.

The image data generating unit 22 calculates object image data in the camera coordinate system based on the object data supplied from the object data storing unit 21 and the space coordinate transformation matrix supplied from the positional relationship estimating unit 20. Receiving the instruction by a user via the input unit 5, the image data generating unit 22 synthesizes object image data and real image data, to thereby generate AR image data. The CPU 10 supplies the AR image data generated as described above to the display 3.

The display 3 displays the supplied AR image data as an AR image.

As described above, the AR image is displayed on the display 3. Note that, the series of processing is executed by one frame (for example, 1/30 second) or by the time shorter than that. Therefore, time-oriented continuing AR images are displayed on the display 3 as a motion picture. In a case where the camera 4 is moved with respect to the marker M, the object image J is also changed according thereto.

The positional relationship estimating unit 20 will be described in detail.

FIG. 5 is a block diagram showing a functional structure of the positional relationship estimating unit 20 in detail.

As shown in FIG. 5, the positional relationship estimating unit 20 includes a marker detecting unit 23, a displacement amount calculating unit 24, and a transformation matrix calculating unit 25.

Real image data picked up by the camera 4 is supplied to the marker detecting unit 23 and the displacement amount calculating unit 24.

The marker detecting unit 23 will be described.

Marker information is previously registered in the marker detecting unit 23. The marker information is, for example, in a case where the marker is a square as shown in FIG. 6A, the length of each side or the like of an image of the marker picked up in a vertical direction at a predetermined distance. Note that, by previously registering information on an object existing in the real space in the marker detecting unit 23, it is possible to use the object as a marker.

The marker detecting unit 23 binarizes the real image data by using a threshold, and calculates an area and a circumscribed rectangle by a connected region (continuous regions of the same value). For example, in FIG. 6, with regard to one or more continuous regions having the value "black" as the connected region, an area and a circumscribed rectangle are calculated. Subsequently, the marker detecting unit 23 excludes a region having an area value larger than a threshold as a large region and a region having an area value smaller than another threshold as a small region, and also excludes a connected region located in an outer periphery of the image based on circumscribed rectangle information.

The marker detecting unit 23 further tracks outlines of remaining connected regions, and stores all the pixel positions on the outline. Next, the marker detecting unit 23 approximates the outline to obtain a polygonal line made of connected straight lines, and detects a connected region being the approximate result as a candidate for the marker M. Here, because the black square having a predetermined size is registered as the marker, a connected region having an outline made of four connected straight lines each having approximately the same length is a candidate for the marker M. FIG. 6B is a conceptual diagram showing a picked-up image of a connected region being a candidate for the marker M, and FIG. 6C shows an outline L after the polygonal line approximating generated by the above-mentioned processing with respect to the image. The marker detecting unit 23 stores pixel positions in a real image of intersections (points P shown in FIG. 6C) of the straight lines constituting the outline of the connected region detected as the marker M candidate.

Next, the marker detecting unit 23 normalizes the connected region of the marker M candidate, that is, transforms the connected region into a shape viewed in the vertical direction. In this example, since a square is employed as the marker, the marker detecting unit 23 generates a plane coordinate transformation matrix with which the pixel positions of the four intersections P serve as four square vertexes, and performs coordinate transform with respect to the image of the connected region as the marker M candidate by using the plane coordinate transformation matrix. Subsequently, the marker detecting unit 23 performs pattern matching with the registered marker with respect to the image of the connected region to which the coordinate transform is performed. The marker detecting unit 23 recognizes the connected region determined to have the highest similarity with the registered marker as a result of the pattern matching as the marker M. The marker detecting unit 23 supplies the pixel positions (hereinafter, marker pixel position) of the four intersections P of the connected region recognized as the marker M to the transformation matrix calculating unit 25. The marker detecting unit 23 supplies, in a case of failing to detect a marker M, an instruction therefor to the transformation matrix calculating unit 25. The case where the marker detecting unit 23 fails to detect a marker M is, a case where all the connected regions are excluded as the above-mentioned large region or small region, a case where the similarity is equal to or less than a threshold, or the like.

Next, estimating processing by the displacement amount calculating unit 24 will be described.

Figure 7A:
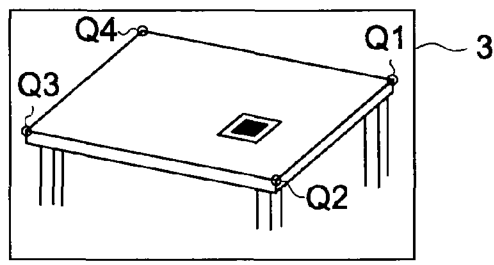
FIG. 7 are schematic diagrams showing how to set feature points.

First, the displacement amount calculating unit 24 extracts a feature point from a real image (referred to as first frame image) of a specific frame supplied from the camera 4. The feature point is a point that the displacement amount calculating unit 24 is capable of detecting stably. Specifically, the feature point may be a corner of an object displayed on the real image capable of being detected by using Moravec operator or the like. The displacement amount calculating unit 24 sets the feature point on a plurality of pixel positions dispersed in the real image. FIG. 7A is a schematic diagram showing feature points set in the real image exemplified in FIG. 3A. FIG. 7A shows the feature points of the first frame image as points Q1, Q2, Q3, and Q4. Note that, actually, a larger number of the feature points are set.

The displacement amount calculating unit 24 further extracts information on a plurality of pixels being the feature point as a center, as a template. The displacement amount calculating unit 24 stores the pixel position of the feature point and the template related to the pixel position.

Figure 7B:
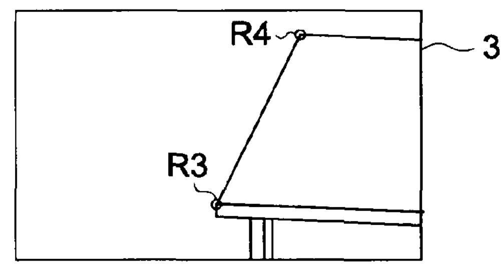

When image data of a real image of the next frame (referred to as second frame image) is supplied to the displacement amount calculating unit 24, the displacement amount calculating unit 24 performs template matching by using the above-mentioned template with respect to the second frame image. Specifically, the displacement amount calculating unit 24 performs, first, a rough search by using sequential similarity detection algorithm using a square error as an evaluation scale. The displacement amount calculating unit 24 performs a rough search by using a reduced image, and performs the template matching at larger intervals. The displacement amount calculating unit 24 performs, next, a precise search by using normalized cross correlation in the vicinity of a position having the highest matching correlation. The displacement amount calculating unit 24 sets, as described above, a feature point corresponding to the feature point in the first frame image, in the second frame image. FIG. 7B shows points R3 and R4 as the feature points in the second frame image. The point R3 corresponds to the point Q3, and the point R4 corresponds to the point Q4.

Figure 7C:
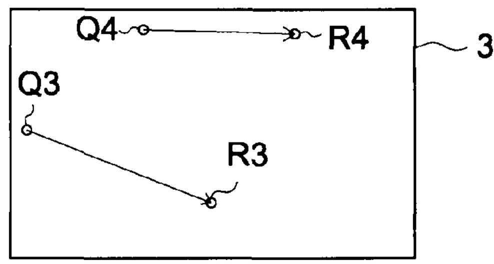

Next, the displacement amount calculating unit 24 obtains displacement amounts (displacement vectors) of the pixel positions between the corresponding feature points in the first frame image and the second frame image, that is, between Q3 and R3 and between Q4 and R4. FIG. 7C schematically shows the displacement vectors obtained by the displacement amount calculating unit 24. The displacement amount calculating unit 24 supplies a displacement amount (hereinafter, pixel position displacement amount) of each pixel position of the corresponding feature point obtained as described above to the transformation matrix calculating unit 25.

Next, the transformation matrix calculating unit 25 will be described.

A case where the marker detecting unit 23 supplies the marker pixel position to the transformation matrix calculating unit 25 will be described.

The transformation matrix calculating unit 25 obtains an equation of straight lines of the two sides facing each other based on the marker pixel positions, that is, the pixel positions of the four intersections P.

Since the two sides of the marker M are on the same plane in the real space, a rotational transform component for transforming a real image plane to a real space plane is obtained. Further, by using the pixel positions of the four intersections P and the rotational transform component, a parallel translation component in the real space plane is obtained. The transformation matrix calculating unit 25 calculates a space coordinate transformation matrix based on those rotational transform component and parallel translation component to supply to the image data generating unit 22.

A case where the marker detecting unit 23 supplies an instruction that a marker M is not detected to the transformation matrix calculating unit 25 will be described.

The transformation matrix calculating unit 25 applies the pixel position displacement amount supplied from the displacement amount calculating unit 24 to the space coordinate transformation matrix calculated in a frame one frame before the frame in which the instruction that a marker M is not detected is supplied. Specifically, the transformation matrix calculating unit 25 generates a space coordinate transformation matrix for transforming the pixel position of the feature point in the previous frame into a pixel position of a feature point in the present frame, and multiplies that by the space coordinate transformation matrix calculated in the previous frame. Therefore, even in the case where an image pickup area does not have a marker M, it is possible to estimate a space coordinate transformation matrix.

Figure 8:
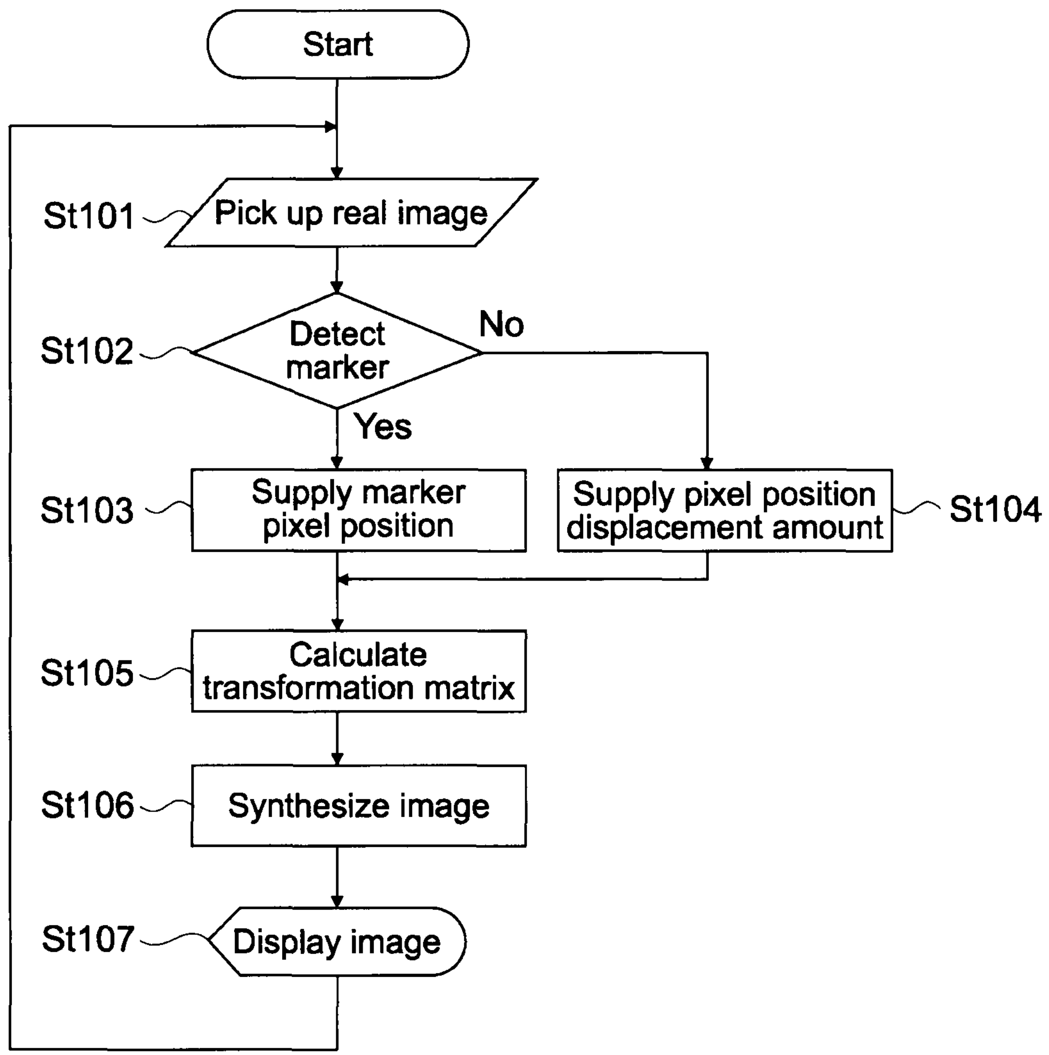
FIG. 8 is a flowchart showing operations of the information processing apparatus according to the first embodiment.

A chain of operations of the information processing apparatus 1 will be described with reference to a flowchart. FIG. 8 is a flowchart showing the operations of the information processing apparatus 1. When the marker M is detected in the real image data, the following operations are started.

The camera 4 picks up an image of the real space, to obtain real image data (St101). Next, the marker detecting unit 23 performs detecting processing of the marker M in the real image (St102). In a case where the marker M is detected (Yes), the marker detecting unit 23 supplies the marker pixel position to the transformation matrix calculating unit 25 (St103). In a case where the marker M is not detected (No), the displacement amount calculating unit 24 supplies the pixel position displacement amount to the transformation matrix calculating unit 25 (St104). Next, the transformation matrix calculating unit 25 calculates the space coordinate transformation matrix based on the marker pixel position or the pixel position displacement amount (St105). Subsequently, the image data generating unit 22 calculates the object image data based on the space coordinate transformation matrix, and synthesizes the object image data with the real image data, to thereby generate the AR image data (St106). Then, the display 3 displays the AR image data on a display screen as the AR image (St107). Thereafter, processing from picking up an image of a real image to displaying an AR image in the next frame will be performed repeatedly.

FIG. 9 are examples of real images picked up by the information processing apparatus 1 and generated AR images. It is assumed that the camera 4 picks up images of the real space while moving with respect to the real space. FIGS. 9A, 9B, and 9C show real images picked up in this order. FIG. 9D shows an AR image generated with respect to the real image shown in FIG. 9A, FIG. 9E shows an AR image generated with respect to the real image shown in FIG. 9B, and FIG. 9F shows an AR image generated with respect to the real image shown in FIG. 9C.

Figure 9A:
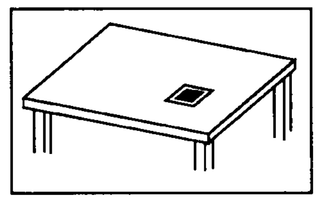
FIG. 9 are schematic diagrams showing a real image and an augmented reality image picked up/generated by the information processing apparatus.
Figure 9D:
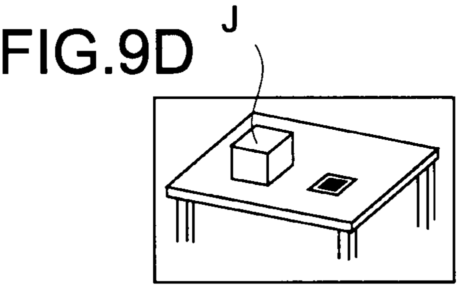
Figure 9B:
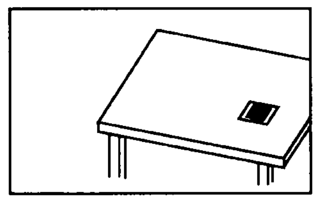
Figure 9E:
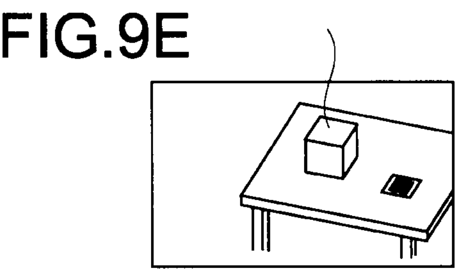
Figure 9C:
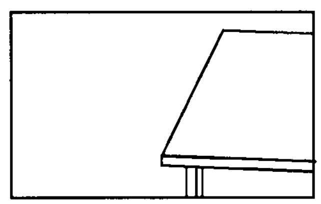
Figure 9F:
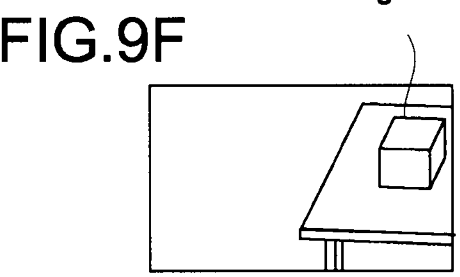

As shown in FIG. 9A, in a case where the image pickup area includes the marker M, the information processing apparatus 1 synthesizes the object image J based on the marker pixel position in the real image, to thereby generate the AR image shown in FIG. 9D. Next, as shown in FIG. 9B, in a case where the image pickup area still includes the marker M after the movement of the camera 4, the information processing apparatus 1 synthesizes the object image J based on the marker pixel position in the real image after the movement of the camera 4, to thereby generate the AR image shown in FIG. 9E. Further, as shown in FIG. 9C, in a case where the image pickup area does not include the marker M after the movement of the camera 4, the information processing apparatus 1 synthesizes the object image J based on the pixel position displacement amount between the real image shown in FIG. 9B and the real image shown in FIG. 9C, to thereby generate the AR image shown in FIG. 9F.

As described above, the information processing apparatus according to this embodiment is capable of estimating the spatial positional relationship of the camera 4 to the marker M by using both the marker detection and the feature point displacement. As a result, once capturing the marker in the image pickup area of the camera 4, the information processing apparatus 1 is capable of generating the AR image even if the image pickup area does not include the marker thereafter.

Second Embodiment

A second embodiment according to the present invention will be described.

In the second embodiment, the same reference symbols will be attached to the structures same as those in the first embodiment, and the description thereof will be omitted. Note that, the camera 4, the input unit 5, and the positional relationship estimating unit 20 in the first embodiment correspond to a first camera 4, a first input unit 5, and a first positional relationship estimating unit 20 in this embodiment, respectively.

Figure 10:
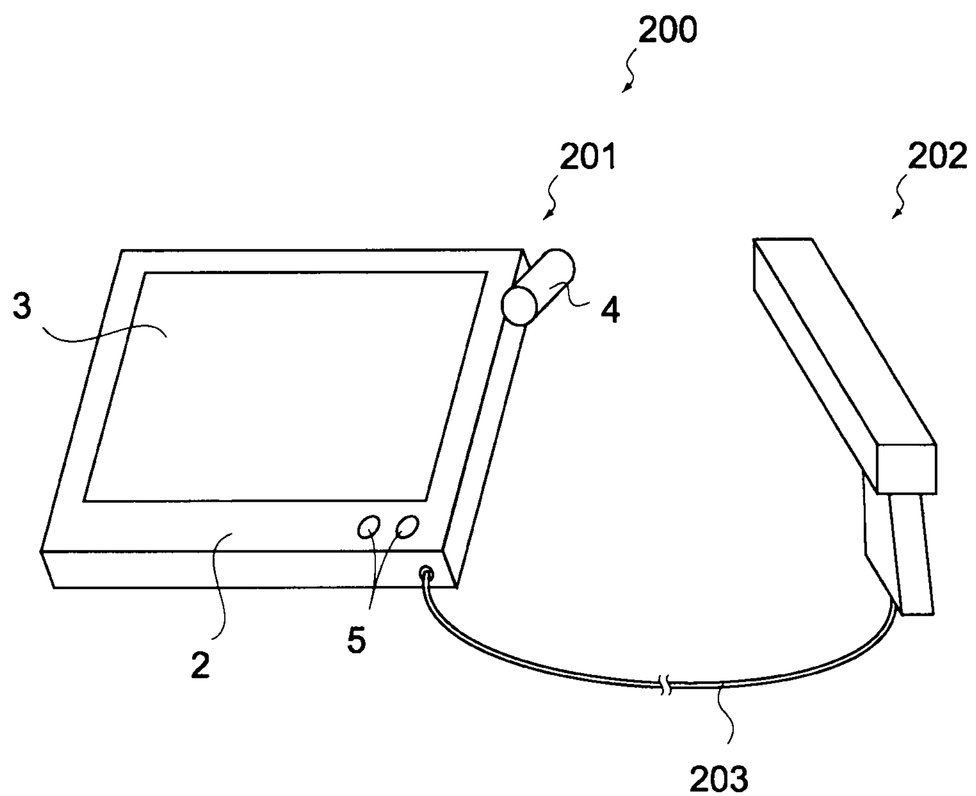
FIG. 10 is a perspective view showing an outer appearance of an information processing system according to a second embodiment.

FIG. 10 is a perspective view showing an outer appearance of an information processing system 200 according to the second embodiment of the present invention. As shown in FIG. 10, the information processing system 200 includes an AR viewer 201 (first information processing apparatus) and an AR controller 202 (second information processing apparatus). The AR viewer 201 has the structure same as that of the information processing apparatus 1 of the first embodiment. That is, the display 3, the first camera 4 (first image pickup means), and the first input unit 5 are provided on the main body 2. The AR viewer 201 and the AR controller 202 are connected by a cable 203. Note that, the connection may be a wireless connection.

Figure 11:
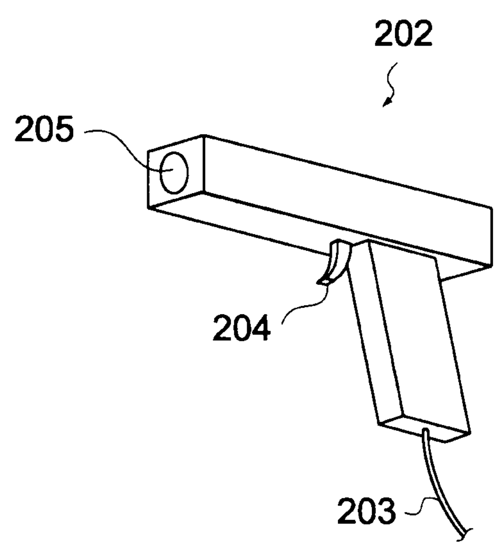
FIG. 11 is a perspective view showing an AR controller of the information processing system.

FIG. 11 is a perspective view showing the AR controller 202. As shown in FIG. 11, the AR controller 202 has a shape resembling, for example, a "gun", and includes a second input unit 204 (input unit) as a switch being a trigger. Further, a second camera 205 (second image pickup means) is provided on a front end of the AR controller 202. Note that, the shape of the AR controller 202 is not limited to the one shown here, but may be another shape including the second camera 205 and the second input unit 204.

Figure 12:
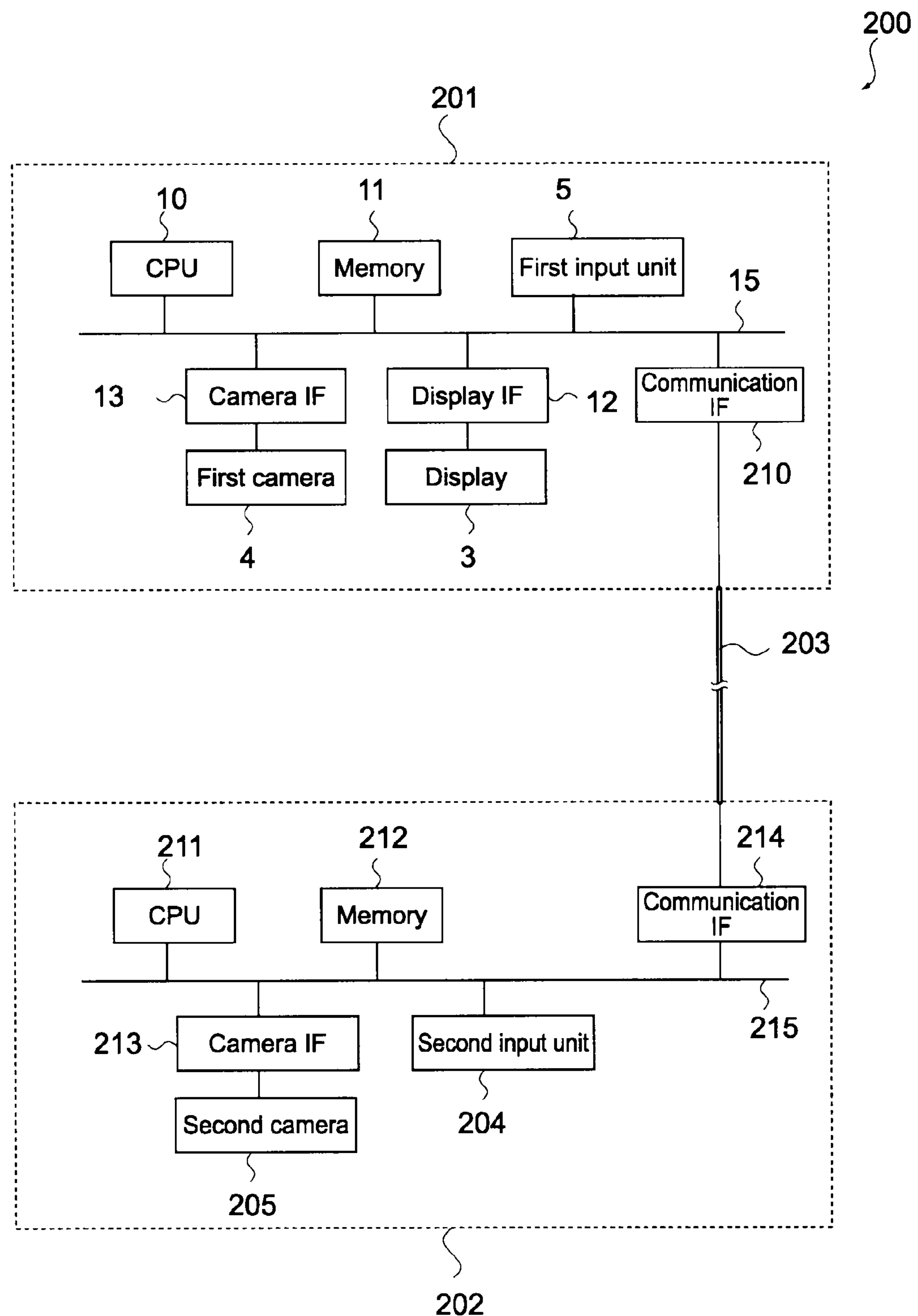
FIG. 12 is a block diagram showing a structure of the information processing system.

FIG. 12 is a block diagram showing a structure of the information processing system 200.

As shown in FIG. 12, the AR viewer 201 further includes, in addition to the structure of the information processing apparatus 1 of the first embodiment, a communication interface 210 (receiving unit) connected to the bus 15. The cable 203 is connected to the communication interface 210.

The AR controller 202 further includes a CPU 211, a memory 212, a camera interface 213, and a communication interface 214 (transmitting unit). The second camera 205 is connected to the camera interface 213. The cable 203 is connected to the communication interface 214. The CPU 211, the memory 212, the camera interface 213, the second input unit 204, and the communication interface 214 are connected to each other by the bus 215. Note that, the structure of the AR controller 202 is not limited to the one shown here.

Figure 13A:
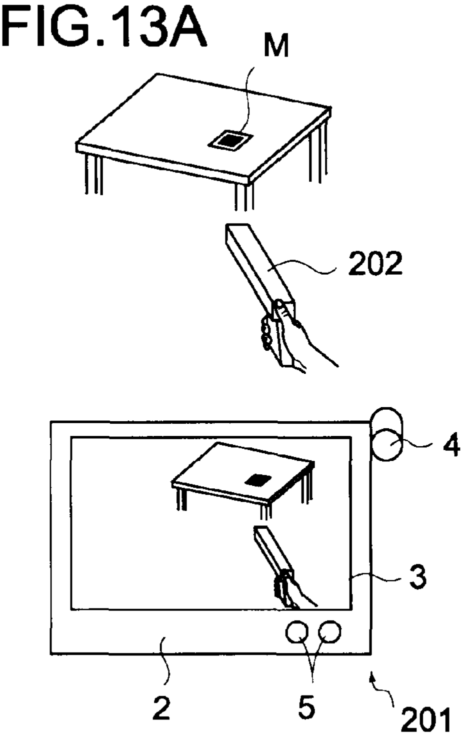
FIG. 13 are schematic diagrams exemplifying an outline of generation of an augmented reality image by the information processing system.
Figure 13B:
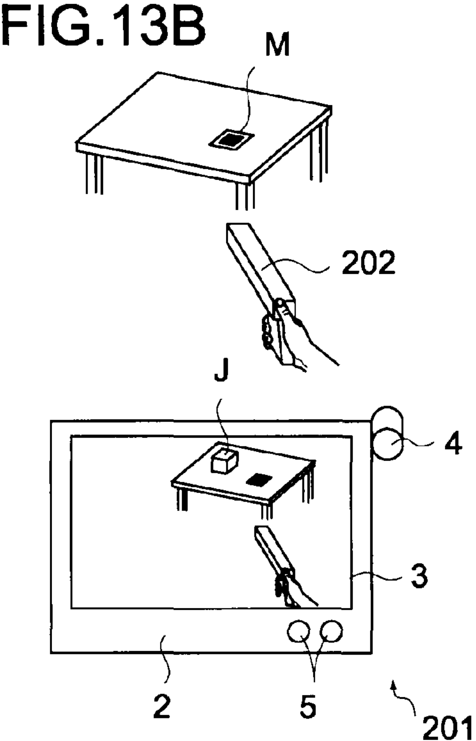

FIG. 13 are schematic diagrams exemplifying an outline of generation of an AR image by the information processing system 200. As shown in FIG. 13A, a user points the AR controller 202 at the real space. The first camera 4 picks up a real image, which is displayed on the display 3. On the display 3, the AR controller 202 held by the user is displayed as a real image. When an AR image generation instruction by the user is given to the information processing system 200, as shown in FIG. 13B, an AR image in which the real image is synthesized with the object image J is displayed on the display 3. So far, the operations are same as those of the information processing apparatus 1 of the first embodiment.

Figure 13C:
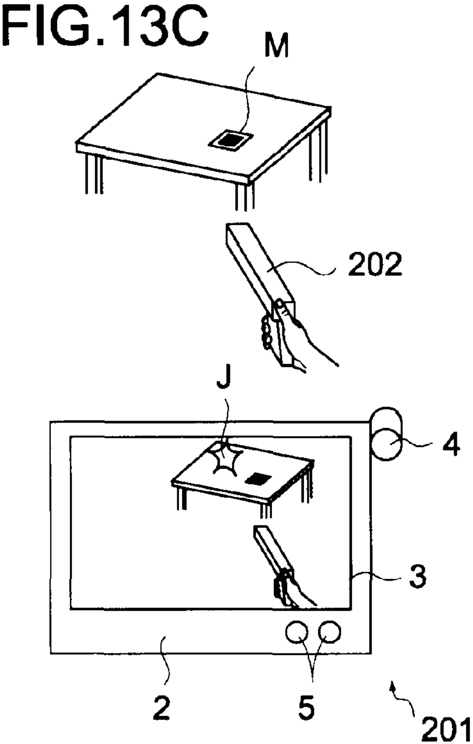

When the user takes a sight of the AR controller 202 at a virtual object shown as the object image J while watching the AR image displayed on the display 3, and operates the second input unit 204, as shown in FIG. 13C, the object image J is changed. In FIG. 13C, an effect showing as if a bullet directly hits the object image J is superimposed. Such operations of the information processing system 200 will be described below in detail.

Figure 14:
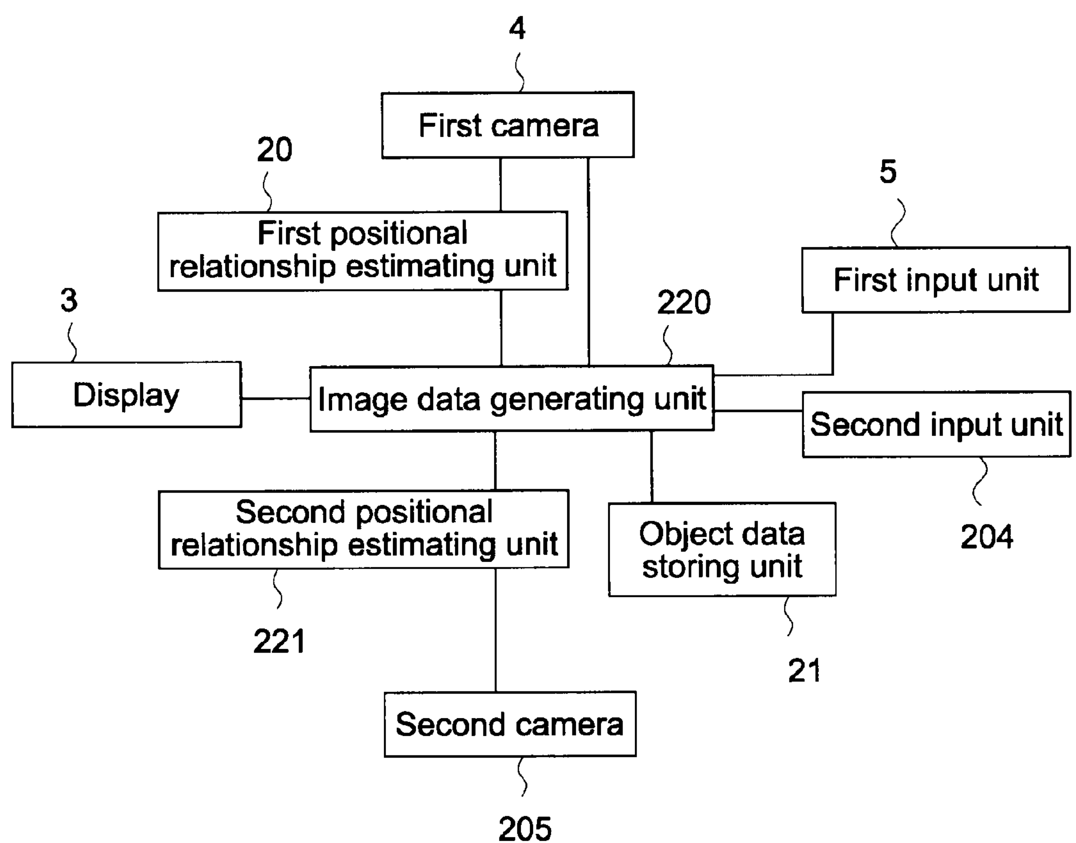
FIG. 14 is a block diagram showing a functional structure of the information processing system.

FIG. 14 is a block diagram showing a functional structure of the information processing system 200.

As shown in FIG. 14, the functional structure of the information processing system 200 includes, in addition to the structure of the information processing apparatus 1 of the first embodiment, the above-mentioned second camera 205 and second input unit 204, and a second positional relationship estimating unit 221. Further, the information processing system 200 includes an image data generating unit 220 in place of the image data generating unit 22 of the first embodiment. Note that, the second positional relationship estimating unit 221 is implemented by the CPU 211, the memory 212, and the like.

The second camera 205 picks up an image of a real space, and provides real image data to the second positional relationship estimating unit 221. Because the spatial position of the second camera 205 is different from that of the first camera 4, the real image picked up by the second camera 205 is different from that picked up by the first camera 4. Hereinafter, the real image picked up by the first camera 4 is referred to as "first real image", data of the first real image is referred to as "first real image data", the real image picked up by the second camera 205 is referred to as "second real image", and data of the second real image is referred to as "second real image data".

The second positional relationship estimating unit 221 generates a second space coordinate transformation matrix to transform a marker coordinate system with reference to the marker M into a second camera coordinate system with reference to the second camera 205 based on the second real image data supplied from the second camera 205. The second positional relationship estimating unit 221 supplies the space coordinate transformation matrix to the image data generating unit 220. The second positional relationship estimating unit 221 will be described below in detail.

The image data generating unit 220 generates, similar to the first embodiment, object image data in the first camera coordinate system with reference to the first camera 4 based on the object data supplied from the object data storing unit 21 and the first space coordinate transformation matrix supplied from the first positional relationship estimating unit 20.

Further, the image data generating unit 220 determines if a predetermined positional relationship is established between the AR controller 202 and the virtual object based on the object data supplied from the object data storing unit 21 and the second space coordinate transformation matrix supplied from the second positional relationship estimating unit 221. The predetermined positional relationship is, for example, a positional relationship in which a virtual object is assumed to be in an axial direction of the AR controller 202. The image data generating unit 220 makes a change, in a case of determining that the predetermined positional relationship is established, to the object image data in the above-mentioned first camera coordinate system. Here, the change is, for example, to add an effect showing that an bullet directly hits the object image data or the like. Meanwhile, in a case of determining that the predetermined positional relationship is not established, the image data generating unit 220 may make a change showing that the sight of the AR controller 202 was not taken at the virtual object or may not make a change at all.

The image data generating unit 220 synthesizes the object image data calculated by using the first space coordinate transformation matrix or the object image data changed as described above with the first real image data, to thereby generate an AR image. The CPU 10 supplies the AR image data generated as described above to the display 3.

The second positional relationship estimating unit 221 will be described in detail.

The second positional relationship estimating unit 221 has the structure same as those of the positional relationship estimating unit 20 of the first embodiment shown in FIG. 5 and the first positional relationship estimating unit 20 of this embodiment. That is, the second positional relationship estimating unit 221 includes the marker detecting unit 23, the displacement amount calculating unit 24, and the transformation matrix calculating unit 25. Whereas the first positional relationship estimating unit 20 generates a first transformation matrix from the first real image data picked up by the first camera 4, the second positional relationship estimating unit 221 generates a second transformation matrix from the second real image data picked up by the second camera 205.

Figure 15:
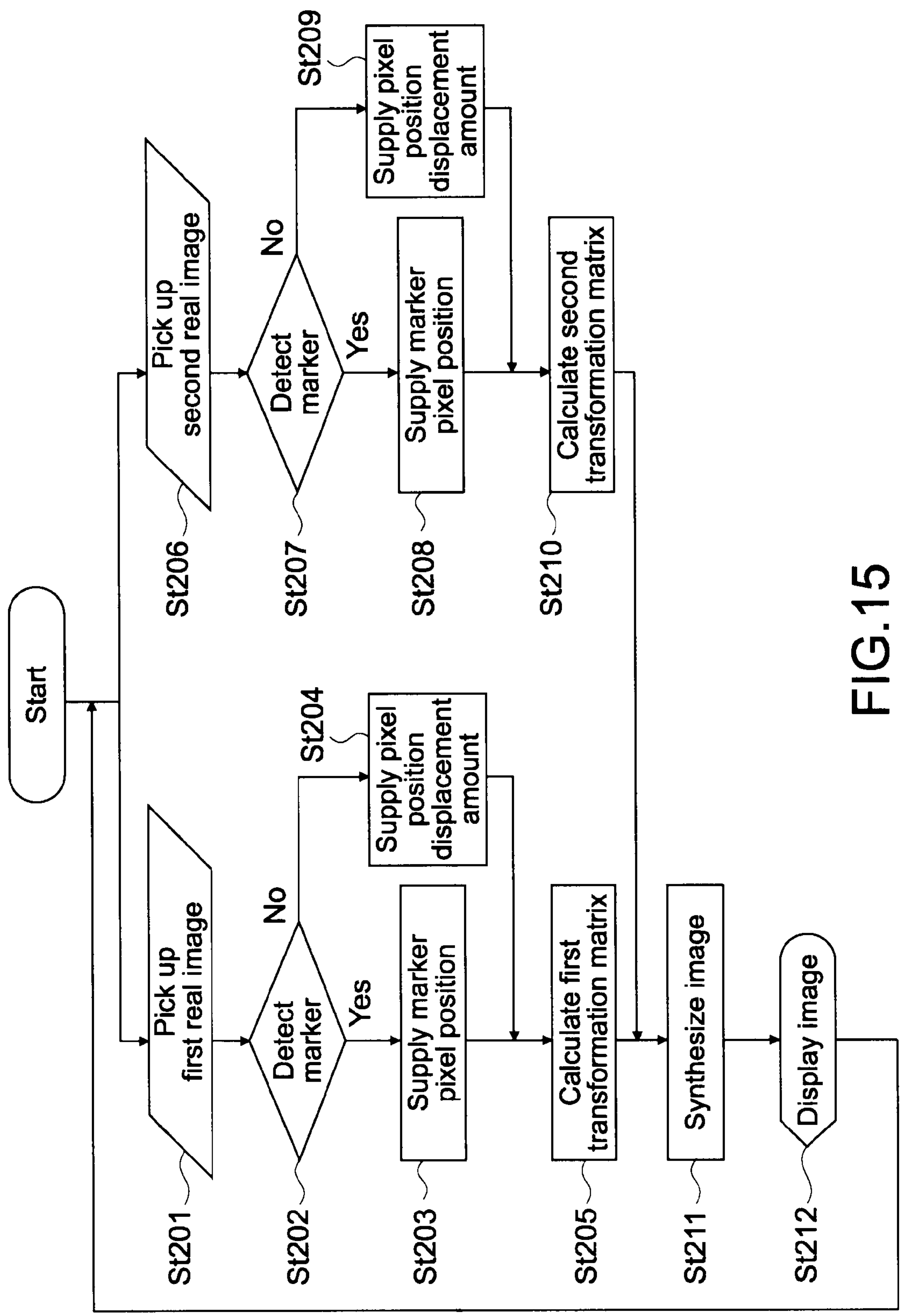
FIG. 15 is a flowchart showing operations of the information processing system.

The series of processing of the information processing system 200 will be described with reference to a flowchart. FIG. 15 is a flowchart showing the operations of the information processing system 200. When the first real image data is detected and the marker M is detected in the first real image data, the following operations are started.

The operations of St201-205 are the same as those of the information processing apparatus 1 of the first embodiment. That is, the first camera 4 picks up an image of the real space, to obtain first real image data (St201). Next, the marker detecting unit 23 performs detecting processing of the marker M in the first real image (St202). In a case where the marker M is detected (Yes), the marker detecting unit 23 supplies the marker pixel position to the transformation matrix calculating unit 25 (St203). In a case where the marker M is not detected (No), the displacement amount calculating unit 24 supplies the pixel position displacement amount to the transformation matrix calculating unit 25 (St204). Next, the transformation matrix calculating unit 25 calculates the first space coordinate transformation matrix based on the marker pixel position or the pixel position displacement amount (St205).

Concurrently with picking up the image of the real space to thereby obtain the first real image data by the first camera 4, the second camera 205 also picks up an image of the real space, to obtain second real image data (St206). Next, the marker detecting unit 23 performs detecting processing of the marker M in the second real image (St207). In a case where the marker M is detected (Yes), the marker detecting unit 23 supplies the marker pixel position to the transformation matrix calculating unit 25 (St208). In a case where the marker M is not detected (No), the displacement amount calculating unit 24 supplies the pixel position displacement amount to the transformation matrix calculating unit 25 (St209). Next, the transformation matrix calculating unit 25 calculates the second space coordinate transformation matrix based on the marker pixel position or the pixel position displacement amount (St210).

Next, the image data generating unit 220 extracts the object image data based on the first space coordinate transformation matrix to synthesize with the first real image data, or synthesizes the object image data changed based on the second space coordinate transformation matrix with the real image data, to thereby generate AR image data (St211). The display 3 displays the AR image data on the display screen as an AR image (St212). Thereafter, processing from picking up an image of a real image to displaying an AR image in the next frame will be performed repeatedly.

As described above, the information processing system 200 according to this embodiment is capable of estimating the spatial positional relationship between the first camera 4 and the second camera 205 with respect to the marker M by using both the marker detection and the feature point displacement. Therefore, the information processing system 200 is capable of determining if the predetermined positional relationship is established between the AR controller 202 and the virtual object, and making a change to the object image J according to the input operation by a user.

As another example of this embodiment, in a case where the predetermined positional relationship is established between the virtual object displayed as the object image J and the AR controller 202, the information processing system 200 may make a change by changing the color of the object image J or by blinking the object image J, to thereby show that the predetermined positional relationship is established between the AR controller 202 and the virtual object to a user. Further, assuming that the AR controller 202 is a light source, the object image J may be displayed as if the AR controller 202 irradiates the virtual object with lights.

Third Embodiment

A third embodiment according to the present invention will be described.

In the third embodiment, the same reference symbols will be attached to the structures same as those in the first embodiment and the second embodiment, and the description thereof will be omitted. The outer appearance and the structure of the information processing system according to this embodiment are the same as those of the information processing system 200 according to the second embodiment, and the functional structure of the image data generating unit 220 is different.

Figure 16A:
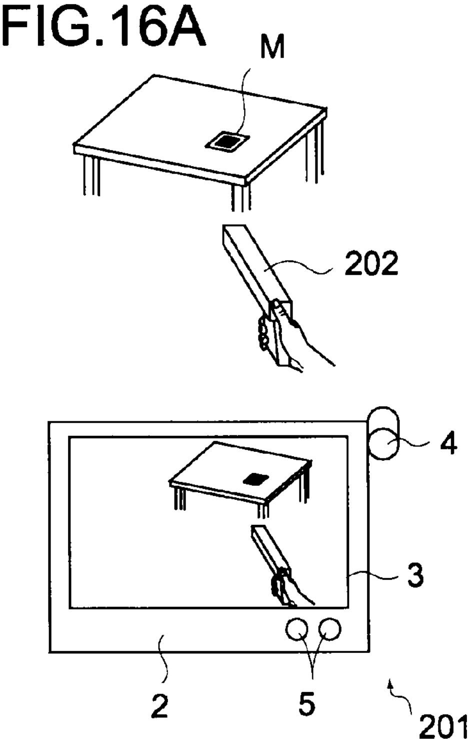
FIG. 16 are schematic diagrams exemplifying an outline of generation of an augmented reality image by an information processing system according to the third embodiment.
Figure 16B:
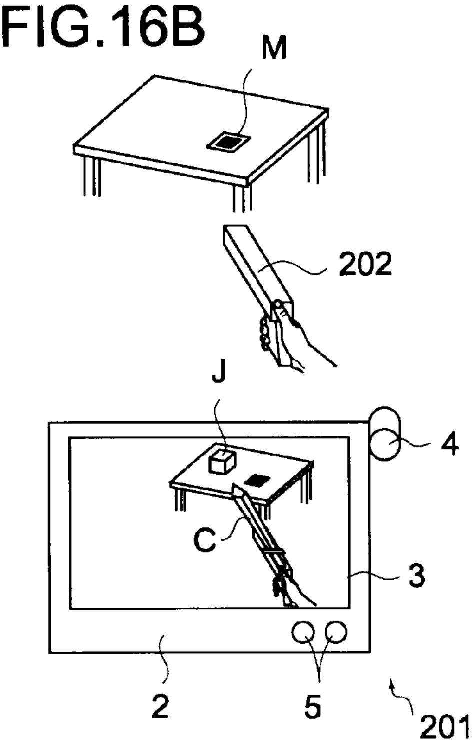
Figure 16C:
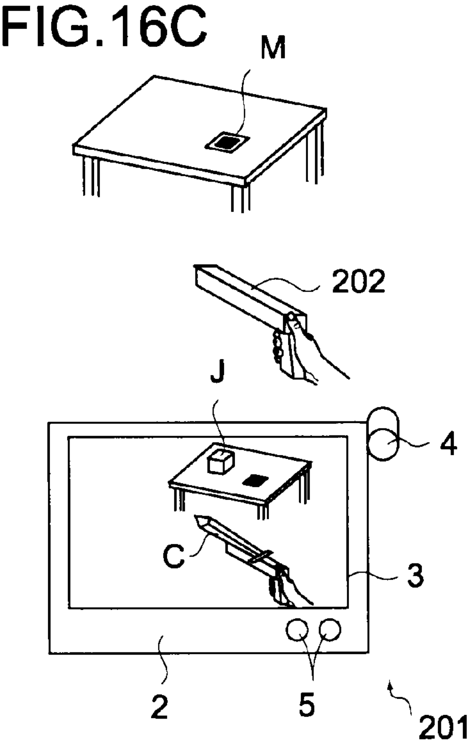

FIG. 16 are schematic diagrams exemplifying an outline of generation of an AR image by the information processing system according to this embodiment. As shown in FIG. 16A, a user points the AR controller 202 at the real space. The first camera 4 picks up a real image including the AR controller 202, and the real image including the AR controller 202 is displayed on the display 3. When the AR image generation instruction is given by a user through the first input unit 5 provided on the AR viewer 201 or the second input unit 204 provided on the AR controller 202, as shown in FIG. 16B, an AR image in which the object image J and an image (hereinafter, controller image) C corresponding to the AR controller 202 are synthesized with the real image is displayed on the display 3. Here, a case where an image of a "sword" is used as the controller image C is shown. Further, when a user changes the spatial positional relationship of the AR controller 202 to the marker M from the state shown in FIG. 16B, the controller image C is also changed accordingly as shown in FIG. 16C.

In the following, the above-mentioned operations will be described in detail.

The image data generating unit 220 of this embodiment calculates, similar to the first embodiment and the second embodiment, object image data in the first camera coordinate system with reference to the first camera 4 based on the object data supplied from the object data storing unit 21 and the first space coordinate transformation matrix supplied from the first positional relationship estimating unit 20.

Further, the image data generating unit 220 calculates a third space coordinate transformation matrix based on the first space coordinate transformation matrix supplied from the first positional relationship estimating unit 20 and the second space coordinate transformation matrix supplied from the second positional relationship estimating unit 221. The third space coordinate transformation matrix is a space coordinate transformation matrix to transform the second camera coordinate system with reference to the second camera 205 into the first camera coordinate system with reference to the first camera 4. For example, the third space coordinate transformation matrix may be calculated by dividing the first space coordinate transformation matrix by the second space coordinate transformation matrix, or the like.

The image data generating unit 220 calculates the controller image data in the first camera coordinate system based on the object data (hereinafter, controller object data) representing the AR controller 202 stored in the object data storing unit 21 and the third space coordinate transformation matrix. Here, the controller object data may be three-dimensional data or two-dimensional data.

As described above, the image data generating unit 220 transforms the marker coordinate system into the first camera coordinate system by using the first space coordinate transformation matrix to calculate the object image data, and transforms the second camera coordinate system into the first camera coordinate system by using the third space coordinate transformation matrix to calculate the controller image data.

The image data generating unit 220 synthesizes the object image data and the controller image data with the real image, to thereby generate the AR image data. The display 3 displays the AR image in which the object image J and the controller image C are synthesized with the real image on the display 3. Because the controller image data is calculated based on the third space coordinate transformation matrix for transforming the second camera coordinate system into the first camera coordinate system, the controller image C is an image corresponding to the AR controller 202. Note that, "corresponding to" means that the controller image C is displayed as if the controller object has the spatial positional relationship same as that of the AR controller 202.

Further, the image data generating unit 220 of this embodiment is capable of determining if a predetermined positional relationship is established between the AR controller 202 and the virtual object displayed as the object image J based on the second space coordinate transformation matrix or the third space coordinate transformation matrix. The predetermined positional relationship is, for example, a positional relationship in which a virtual object is assumed to be in the axial direction of the AR controller 202, or a positional relationship in which the controller image C is superimposed on the object image J. The image data generating unit 220 may make a change to the object image J in a case where such a predetermined positional relationship is established or not.

The information processing system according to this embodiment estimates the spatial positional relationship of the first camera 4 and the second camera 205 to the marker M by using both the marker detection and the feature point displacement, and calculates, based thereon, the spatial positional relationship of the second camera 205 to the first camera 4. Therefore, the information processing system is capable of generating the AR image in which the image corresponding to the AR controller 202 is synthesized.

As another example of this embodiment, the information processing system may display a trajectory of the AR controller 202 moving in the real space on the display 3 as a "line". Therefore, the information processing system is capable of displaying a line on the display 3 as if a user draws a line in the real space three-dimensionally. Further, the information processing system according to this embodiment is capable of being used to view the controller image. For example, by using three-dimensional data showing an outer appearance of an "airplane" as the controller object data, the information processing system is capable of displaying, by changing the spatial positional relationship of the AR controller 202, the airplane as if it is flying.

It should be understood by those skilled in the art that various modifications, combinations, sub-combinations and alterations may occur depending on design requirements and other factors insofar as they are within the scope of the appended claims or the equivalents thereof.

In the above-mentioned embodiments, the AR controller generates the second space coordinate transformation matrix. Not limited to this, the image picked up by the second camera of the AR controller may be transmitted to an AR viewer, and the AR viewer may generate the second space coordinate transformation matrix.

In the above-mentioned embodiments, the AR viewer generates the AR image by using the first transformation matrix or the second space coordinate transformation matrix. Not limited to this, for example, communication means provided on the AR viewer may transmit the first space coordinate transformation matrix and the second space coordinate transformation matrix to another information processing apparatus, and the information processing apparatus may generate the AR image.

In the above-mentioned embodiments, one AR viewer is accompanied by one AR controller. Not limited to this, one AR viewer may be accompanied by two or more AR controllers. Therefore, for example, processing in which a user holds the two AR controllers with the right and left hands, respectively, and picks up a virtual object by sandwiching it with the both hands, is enabled.

By picking up an image of one marker by first cameras of a plurality of AR viewers, a plurality of users are capable of sharing a virtual space with reference to the marker. For example, one virtual object is displayed on the plurality of AR viewers whose positions are different from each other as object images seen in different angles, respectively. By interfacing the plurality of AR viewers, each of the AR viewers is capable of grasping the spatial positional relationship of the other AR viewers. For example, an AR viewer is capable of displaying an object image representing another user at the position of another AR viewer.

In the above-mentioned embodiments, a video see-through type AR system for displaying the AR image in which the real image picked up by the first camera is synthesized with the object image on the display is described. However, the present invention may be applied to an optical see-through type AR system with which the object image is not synthesized with the real image, but independently displayed on a transmissive display.

The present application contains subject matter related to that disclosed in Japanese Priority Patent Application JP 2010-003140 filed in the Japan Patent Office on Jan. 8, 2010, the entire content of which is hereby incorporated by reference.

What is claimed is:

1. An information processing apparatus, comprising:

circuitry configured to pick up an image of a real space to obtain a first background image, estimate, when the first background image includes a first marker image, a first positional relationship as a spatial positional relationship of the information processing apparatus to the marker based on the first marker image, and estimate, when the first background image does not include the first marker image, the first positional relationship based on a displacement of a feature point extracted from the first background image, the feature point being different from the first marker image, the first marker image being an image of a marker previously registered and located in the real space, generate a first additional image based on the first positional relationship, and synthesize the first additional image and the first background image into a synthetic image, and display the synthetic image.

2. The information processing apparatus according to claim 1, wherein the circuitry is further configured to:

pick up an image of a real space to obtain a second background image;

estimate, when the second background image includes a second marker image that is an image of the marker, a second positional relationship as a spatial positional relationship of the information processing apparatus to the marker based on the second marker image; and receive, when the second background image does not include the second marker image, the second positional relationship transmitted from an apparatus to estimate the second positional relationship based on a displacement of a feature point extracted from the second background image, the feature point extracted from the second background image being different from the second marker image, wherein the circuitry generates the first additional image based on the first positional relationship and the received second positional relationship, and synthesizes the first additional image and the first background image to generate the synthetic image.

3. An information processing system, comprising a first information processing apparatus and a second information processing apparatus, wherein the first information processing apparatus includes circuitry configured to pickup an image of a real space, to obtain a first background image, and estimate, in a case where the first background image includes a first marker image, a first positional relationship as a spatial positional relationship of the first information processing apparatus to the marker based on the first marker image, and to estimate, in a case where the first background image fails to include the first marker image, the first positional relationship based on a displacement of a feature point extracted from the first background image, the feature point being different from the first marker image, the first marker image being an image of a marker previously registered and located in the real space, wherein the second information processing apparatus includes circuitry configured to pickup an image of a real space, to obtain a second background image, estimate, in a case where the second background image includes a second marker image, a second positional relationship as a spatial positional relationship of the second information processing apparatus to the second marker based on the second marker image, and to estimate, in a case where the second background image fails to include the second marker image, the second positional relationship based on a displacement of a feature point extracted from the second background image, the feature point being different from the second marker image, the second marker image being an image of a marker previously registered and located in the real space, and transmit the second positional relationship to the first information processing apparatus, and wherein the circuitry of the first information processing apparatus is further configured to receive the second positional relationship transmitted from the second information processing apparatus, generate a first additional image based on the first positional relationship and the received second positional relationship, and to synthesize the first additional image and the first background image, to thereby generate a synthetic image, and display the synthetic image.

4. The information processing system according to claim 3, wherein the circuitry of the second information processing apparatus is further configured to allow an input operation by a user, and to change the first additional image according to an instruction input through an input operation.

5. The information processing system according to claim 4, wherein the circuitry of the first image processing apparatus calculates a third positional relationship being a spatial positional relationship of the second information processing apparatus to the first information processing apparatus based on the first positional relationship and the second positional relationship, generates a second additional image added to the background image based on the third positional relationship, and synthesizes the first additional image, the background image, and the second additional image, to generate the synthetic image.

6. A non-transitory computer-readable medium encoded with computer-readable instructions thereon that, when executed by a computer, cause the computer to perform a method comprising:

estimating, in a case where a first background image picked up by a first image processing apparatus includes a first marker image, a first positional relationship as a spatial positional relationship of the first image processing apparatus to the marker based on the first marker image, and to estimate, in a case where the first background image fails to include the first marker image, the first positional relationship based on a displacement of a feature point extracted from the first background image, the feature point being different from the first marker image, the first marker image being an image of a marker previously registered and located in the real space;

generating a first additional image based on the first positional relationship;

synthesizing the first additional image and the first background image, to generate a synthetic image.

7. An information processing method, comprising:

picking up, by circuitry of a first information processing apparatus, an image of a real space, to thereby obtain a first background image;

estimating, by the circuitry of the information processing apparatus, in a case where the first background image includes a first marker image, a first positional relationship as a spatial positional relationship of the first information processing apparatus to the marker based on the first marker image, and estimating, in a case where the first background image fails to include the first marker image, the first positional relationship based on a displacement of a feature point extracted from the first background image, the feature point being different from the first marker image, the first marker image being an image of a marker previously registered and located in the real space;

generating, by the circuitry of the first information processing apparatus, a first additional image based on the first positional relationship, and synthesizing the first additional image and the first background image, to generate a synthetic image; and displaying, by the circuitry of the first information processing apparatus, the synthetic image.

8. The information processing apparatus according to claim 1, wherein the feature point extracted from the first background image includes an object corner detected in the first background image.

9. The information processing apparatus according to claim 8, wherein the circuitry detects the object corner using a Moravec operator.

10. The information processing apparatus according to claim 9, wherein the circuitry generates a displacement matrix based on a displacement of the feature point across successive frames, and uses the displacement matrix to generate the first additional image.

* * * * *